United States Patent Office 2,781,757
Patented Feb. 19, 1957

2,781,757

LAMINATED CAST IN FRACTURE TREATMENT

John M. Hauser, Chevy Chase, and Thomas E. Forrest, Baltimore, Md., assignors to Elkins-Ewall Rubber Co., Inc., a corporation of Pennsylvania No Drawing. Application February 17, 1955,
Serial No. 488,995

6 Claims. (Cl. 128—89)

This invention relates to fracture treatment and more particularly to improved types of shell casts.

The present treatment for bone fractures includes applying a covering of stockinet directly to the skin on the broken limb, covering this with sheet wadding of raw cotton, and then applying in wetted condition a plaster of Paris bandage which upon subsequent drying provides a cast for holding the bones as set by the physician in position for healing. The application of a cast in this manner has a number of objectionable features.

Upon wetting of the plaster of Paris bandage, a portion of the plaster may and frequently does flow into the wadding and produces a hard rock surface having ridges or points or both. It is also exceedingly difficult because of lack of uniformity in the thickness of the wadding to provide uniform pressure on the body member enclosed in the cast so that not only is the cast uncomfortable but it does not as effectively as possible prevent shifting of the fracture.

It has heretofore been proposed to utilize foam rubber in sheet form as a padding material for fracture treatment but this has not proven satisfactory. When foam rubber is placed in contact with the skin, the perspiration which occurs causes trouble. Rubber also deflects X-rays so that an accurate X-ray picture of the bone cannot be obtained therethrough.

It is the principal object of the present invention to provide an improved fracture treatment in which the objectionable features of prior treatments are eliminated.

It is a further object of the present invention to provide an improved fracture treatment in which a cast can be provided of uniform thickness but thinner than heretofore with greater strength.

It is a further object of the present invention to provide an improved fracture treatment in which a cast is provided which retains its conformity of body shape and form.

It is a further object of the present invention to provide an improved fracture treatment in which the padding material and the plaster of Paris employed in connection therewith are interadherent.

It is a further object of the present invention to provide an improved fracture treatment capable of bivalving and reuse on the patient.

Other objects and advantageous features of the invention will be apparent from the specification and claims.

The nature and characteristic features of the present invention will be more readily understood from the following description although it should, of course, be understood that various modifications and changes can be made in the structure without departing from the spirit of the invention.

In place of the stockinet and cotton wadding heretofore employed in connection with fracture treatment we prefer to use a stabilized foamed material or porous plastic. For this purpose, certain types of polyurethane and of polyvinyl chloride have been found suitable.

The polyurethane is an elastic material made by the reaction of a polyisocyanate on a reactive organic polyester with the simultaneous evolution of a blowing gas through a reaction involving isocyanate groups. Polyisocyanates include an organic compound containing two or more groups of the formula —N=C=O which compound contains no linkages that resulted from the reaction of an NCO group with a reactive hydrogen, by way of example and not as a limitation, including such compounds as tolylene diisocyanates, naphthalene diisocyanates, triphenylmethane triisocyanate and hexamethylene diisocyanate; an organic compound which does not contain free isocyanate groups but which compound or composition reacts under suitable conditions as a polyisocyanate; or an intermediate organic composition containing a reacted isocyanate group and a plurality of unreacted isocyanate groups.

By reactive organic polyester is meant a reactive organic polyester having two or more reactive hydrogen atoms, which reactive organic polyester is capable of being further reacted with a polyisocyanate, as previously defined, at the reactive hydrogen atoms.

The polyurethane is predominantly of the open breathing cell type, is not thermoplastic, and has a density in the range of from about 2.3 pounds to about 5.3 pounds per cubic foot.

We may also use a polyvinyl foam of polyvinyl chloride of open cell structure having a density of from about 6 pounds to about 9 pounds per cubic foot.

The polyurethane or polyvinyl chloride foam is preferably prepared for use in bandages of a thickness of from about one quarter of an inch to about one sixteenth of an inch, depending on the body member to be enclosed. A thickness of about one eighth of an inch has been found satisfactory for many types of casts. The bandage may be made in widths as desired from two inches up to thirty-six inches, depending upon the desires of the user, is preferably of a length of about six feet, and is stored in roll form.

The bandage in plastic foam form is applied directly to the skin of the patient to cover the area around which the cast is to be applied and the wetted plaster of Paris bandage is applied directly thereon. The plaster of Paris, upon drying, adheres directly to the plastic foam bandage therebelow. The plastic foam layer does not, during or after the hardening and shrinking of the plaster of Paris, have any tendency to roll or shift, not only because of its adherent relation to the plaster of Paris, but because of its substantial uniformity of thickness as contrasted with that of the cotton wadding previously employed.

The time required for application of the cast is greatly reduced, in some instances to less than one third of that heretofore required.

The plastic foam bandage may, if desired, be sterilized before or at the time of packaging or before use by being placed in an autoclave for about twenty minutes, at a temperature of the order of 250° F., without injury to the bandage or reduction of its resilient action.

If it is desired to examine the limb on which a cast has been applied as herein disclosed, there is no interference with the usual X-ray examination or photography since the inner lamination does not deflect the X-rays.

Also, if it is desired to examine the limb by bivalving the cast, this may be readily done and after completion of the examination the cast can be closed around the limb and held together in any desired manner such as by adhesive tape. The prior casts, in which cotton wadding was incorporated could not be used in this manner because of the distortion upon removal attendant upon the unequal application of force by the plaster of Paris.

From clinical observations it has been determined that a cast with the liner as herein disclosed seems to have a breathing action so that the tendency to unpleasant odors noticeable with many prior casts is substantially if not wholly eliminated. At the same time the liner is non-toxic and no skin irritation or itching is noted nor is there any tendency of the skin to peel as heretofore.

It may also be noted that there is a reduced fire hazard because of the characteristics of the cast over those with cotton wadding.

We claim:

1. For fracture treatment, a support comprising an inner lamination of foam selected from the group consisting of polyurethane and polyvinyl chloride for direct contact with the skin having an outer covering of plaster of Paris in adherent engagement therewith.

2. For fracture treatment, a support comprising an inner lamination of stabilized foam selected from the group consisting of polyurethane and polyvinyl chloride of a thickness of the order of one-fourth to one-sixteenth of an inch for direct engagement with the skin having an outer covering of plaster of Paris in adherent engagement therewith.

3. For fracture treatment, a support comprising an inner lamination of polyurethane of a density of from about 2.3 to about 5.3 pounds per cubic foot and of a thickness of the order of one-fourth to one-sixteenth of an inch for direct engagement with the skin having an outer covering of plaster of Paris in adherent engagement therewith.

4. For fracture treatment, a support comprising an inner lamination of polyvinyl chloride of a density of from about 6 to about 9 pounds per cubic foot and of a thickness of the order of one-fourth to one-sixteenth of an inch for direct engagement with the skin having an outer covering of plaster of Paris in adherent engagement therewith.

5. The method of supporting a fracture which consists in applying a layer of stabilized foam from the group consisting of polyurethane and polyvinyl chloride directly to the skin of the limb and applying directly to said first layer a covering of plaster of Paris for hardening.

6. The method of supporting a fracture which consists in applying a layer of stabilized foam from the group consisting of polyurethane and polyvinyl chloride of a thickness of the order of one-fourth to one-sixteenth of an inch directly to the skin outside the fracture and applying directly thereto a covering of plaster of Paris for hardening.

References Cited in the file of this patent
UNITED STATES PATENTS

| | | |
|---|---|---|
| 1,902,627 | Elbogen | Mar. 21, 1933 |
| 2,759,475 | Van Swaay | Aug. 21, 1956 |

OTHER REFERENCES

The Lancet for November 6, 1954, pp. 948–951.

The Journal of Bone and Joint Surgery for July 1945, p. 521.

Copies of these publications in Scientific Library.